United States Patent Office.

C. C. PARSONS, OF NEW YORK, N. Y.

Letters Patent No. 92,640, dated July 13, 1869.

---

IMPROVED PROCESS OF PURIFYING ALCOHOL AND OTHER SPIRITS.

---

The Schedule referred to in these Letters Patent and making part of the same.

---

*To whom it may concern:*

Be it known that I, C. C. PARSONS, of the city, county, and State of New York, have invented a certain new and improved Process for Purifying Alcohol and other Distilled Spirits; and I hereby declare the following to be a full, clear, and exact description of the same.

My invention is designed as a substitute for the ordinary processes employed for purifying alcohol and other distilled spirits, and the object I have in view is to devise a process which in itself shall be economical and involve little or no waste, and shall avoid many of the disadvantages attendant upon other processes, such, for instance, as the necessity which arises for keeping a large stock of spirits, in the ordinary charcoal-process.

The invention is based upon the employment of paraffine as the purifying-agent, and consists in so treating the alcohol and paraffine, when mixed together, that the latter shall take up the oils and impurities of the former, the two being then separated by suitable means.

By regulating the quantity of paraffine, and the length of time it is mixed with the spirits, the purification can be carried to any desired point. To give effect to the process, it is essential to have suitable means for agitating the mixture, and for raising or lowering its temperature.

The apparatus employed may be of any ordinary or suitable construction. I prefer to employ a steam-tight tank, furnished with an agitator, and provided with a coil of pipe, or jackets, for receiving the heating or cooling-agents; but any other suitable contrivance for raising or lowering the temperature of the liquid may be used.

In carrying the process into effect, I fill the tank about one-third full of ordinary alcohol, which should preferably contain as much as ninety per cent. of absolute alcohol, or, in other words, be 80 over proof. I then introduce about five per cent., by weight, of pure paraffine, preferring that which has a somewhat low melting-point. The mixture is then heated to about 140° Fahrenheit, and agitated violently for about three hours. At the expiration of that time, I slowly introduce water at the same temperature as that of the mixture, until the tank contains forty-five parts of alcohol to fifty-five parts of water; or, in other words, until the mixture stands 10 below proof.

The agitation is continued for about one hour longer, after which I slowly reduce the temperature, by passing cold water through the coil of pipe, and agitate until the alcohol is reduced in temperature to that of the atmosphere, or to whatever temperature may be desired. I then draw off the alcohol on an ordinary filter, which will retain the paraffine and let the alcohol pass through.

It will be noticed that the agitation continues throughout the operation. The introduction of the warm water causes the paraffine to separate as an oil, retaining and carrying with it the oils, &c., in the spirits, and by then cooling and agitating simultaneously, the paraffine agglomerates or gathers in small lumps, and can be easily removed by filtration. The paraffine thus recovered may be used over again, by first passing a jet of steam through it, so as to drive off the volatile matters.

Spirits containing less than ninety per cent. of alcohol can be used, but they will require to be treated a longer time, and, if they contain much less alcohol, will not be so much improved.

By using less paraffine, and treating a shorter time, as much flavoring may be left in the spirits as may be desired.

I have given the amount of paraffine for an average alcohol, but the quantity may be varied, and the time consumed in the treatment lengthened or shortened, according to the purity of the spirits to be operated on. The spirits, after treatment, may be redistilled and made of any desired strength.

As above mentioned, this process involves little or no waste. No stock of spirits need be kept on hand, as in the ordinary charcoal-process, but the spirits may be bought, finished, and delivered at once to fill orders. And as the paraffine in itself possesses no offensive taste or smell, it can impart no disagreeable quality to the spirits.

I have described what I consider to be the best means, on the whole, for effecting the purification of the alcohol or other distilled spirits, but other means may be devised to accomplish the same result, the process being, of course, based upon the employment of paraffine as the purifying-agent.

What, therefore, I claim, and desire to secure by Letters Patent, is—

1. The use of paraffine in the purification of alcohol or other distilled spirits, substantially as set forth.

2. The process of purifying alcohol or other distilled spirits, by treating the same in the manner and by the means herein described; that is to say, first forming at the requisite temperature an intimate mixture or solution of the paraffine and alcohol, then reducing the strength of the alcohol with water at the same temperature, and then reducing the temperature of the alcohol, and agitating it to separate and agglomerate the particles of the paraffine, and filtering it, substantially as set forth.

In testimony whereof, I have signed my name to this specification, before two subscribing witnesses.

C. C. PARSONS.

Witnesses:
CHARLES F. BLAKE,
W. J. PARSONS.